US 7,723,437 B2

(12) United States Patent
Van Hoywweghen

(10) Patent No.: US 7,723,437 B2
(45) Date of Patent: May 25, 2010

(54) SOFT THERMOPLASTIC VULCANIZATES FROM VERY LOW DENSITY POLYETHYLENE COPOLYMERS

(75) Inventor: Danny Van Hoywweghen, Heverlee (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 640 days.

(21) Appl. No.: 11/259,613

(22) Filed: Oct. 26, 2005

(65) Prior Publication Data

US 2006/0100381 A1    May 11, 2006

(30) Foreign Application Priority Data

Nov. 9, 2004    (EP)   ................................. 04105642

(51) Int. Cl.
*C08L 23/02*    (2006.01)
*C08L 23/04*    (2006.01)
*C08L 23/08*    (2006.01)

(52) U.S. Cl. ...................... 525/210; 525/211; 525/214; 525/232; 525/240; 525/241

(58) Field of Classification Search ................. 525/210, 525/211, 214, 232, 240, 241
See application file for complete search history.

(56) References Cited

U.S. PATENT DOCUMENTS

| 4,978,717 | A | 12/1990 | Hazelton |
| 5,013,793 | A | 5/1991 | Wang |
| 6,143,828 | A | 11/2000 | Chee |
| 6,251,998 | B1 * | 6/2001 | Medsker et al. ............. 525/192 |
| 6,399,710 | B1 | 6/2002 | Finerman |
| 6,774,162 | B1 | 8/2004 | Vortkort |

FOREIGN PATENT DOCUMENTS

| EP | 0 357 322 A2 | 8/1989 |
| EP | 0 472 512 A2 | 8/1991 |
| EP | 0 849 323 A1 | 12/1997 |
| WO | WO 99/27001 | 6/1999 |
| WO | WO 03/051982 A1 | 6/2003 |

* cited by examiner

*Primary Examiner*—Nathan M Nutter

(57) ABSTRACT

The invention is directed to a thermoplastic vulcanizate composition comprising a rubber and a very low density polyethylene copolymer. Furthermore, the invention is directed to a process for making said thermoplastic vulcanizate composition and articles comprising said thermoplastic vulcanizate composition.

20 Claims, No Drawings

SOFT THERMOPLASTIC VULCANIZATES FROM VERY LOW DENSITY POLYETHYLENE COPOLYMERS

CROSS REFERENCE TO RELATED APPLICATION

This application claims priority to EPO Patent Application. 04105642.5 filed on Nov. 9, 2004.

TECHNICAL FIELD OF THE INVENTION

The invention is directed to a thermoplastic vulcanizate composition having improved softness without deterioration of mechanical properties, a process for preparing said thermoplastic vulcanizate composition and articles comprising said thermoplastic vulcanizate composition.

BACKGROUND OF THE INVENTION

Polymer blends which have a combination of both thermoplastic and elastic properties are generally obtained by combining a thermoplastic resin with a rubbery composition in a way such that the rubber component is intimately and uniformly dispersed as a discrete particulate phase within a continuous phase of the thermoplastic. This is usually achieved by exposing the blend of the thermoplastic component and the rubber component to conditions of high shear and temperature while at the same time vulcanizing the particulate phase of the rubber component, for instance, in an extruder or a Brabender mixer. This process is commonly referred to in the art as dynamic vulcanization.

In the prior art thermoplastic vulcanizates ('TPV') comprise polypropylene as the thermoplastic component and as the rubbery phase a rubber such as natural rubber, elastomeric copolymers of ethylene and propylene such as ethylene/propylene rubber (EPR) and ethylene/propylene/(non-conjugated diene) monomer rubber (EP(D)M), butyl rubber, halobutyl rubber, halogenated (e.g. brominated) copolymers of p-alkylstyrene and an isomonoolefin, homo- or copolymers from at least one conjugated diene, or combinations thereof. Among these rubbers, EPDM as the elastomeric component has gained particular attraction and is most commonly used as the elastomeric compound in thermoplastic vulcanizates.

Thermoplastic vulcanizates from polypropylene and a rubber have gained wide acceptance as a substitute for thermoset rubbers in a large variety of applications. The reason is their unique characteristic that, notwithstanding the fact that the rubber component is partially or fully cured, the compositions can be processed and reprocessed by conventional plastic processing techniques such as extrusion, injection molding, blow molding, and compression molding. Scrap or flashing can be salvaged and reprocessed.

It would be desirable for many of these applications to increase the softness of the material or, conversely, to decrease hardness. Within certain limits, this can be achieved by either increasing the amount of extender oils as additives relative to the total amount of thermoplastic resin and rubber or by increasing the amounts of rubber relative to the amount of thermoplastic resin. However, if a certain ratio of the amount of extender oil to the total amount of thermoplastic resin and rubber is exceeded, the extender oil can not reliably be retained within the thermoplastic vulcanizate. Thus, under certain conditions of use (such as elevated temperature, mechanical stress) the extender oil tend to leak from the composition, comparable to leaking of a super-soaked sponge. This effect known as 'oil weeping' not only affects the appearance of the composition but also impacts its mechanical properties since the additional amount of extender oil which was added to the composition in order to soften it is lost. On the other hand, increasing the relative amount of the rubber might provoke a reversal of morphology, i.e., the rubber phase becomes the continuous phase while the thermoplastic resin is dispersed therein. A composition having such a reversed morphology, however, is no longer processable and reprocessable by conventional plastic processing techniques. Furthermore, a large decrease in hardness cannot be obtained by either of these two approaches.

Nevertheless, a need exists in many fields of applications for polymer compostions that are soft and processable by conventional plastic processing techniques (i.e. thermoplastic vulcanizates). It goes without saying that for the sake of wide and universal applicability a decrease of hardness should not result in an unacceptable loss of other important mechanical properties such as ultimate tensile strength, elongation at break, tear, compression set, and the like.

Published international patent application WO 99/27001 discloses a thermoplastic vulcanizate composition comprising from about 20 to about 85 parts by weight rubber and from about 15 to about 80 parts by weight of semi-crystalline polypropylene wherein said parts by weight are based upon 100 parts by weight of said rubber and said polypropylene, and a thermoplastic random ethylene copolymer, wherein the weight ratio of said polypropylene to said random ethylene copolymer is from about 100:5 to 100:150 and wherein said random ethylene copolymer comprises from about 70 to about 95 weight percent repeat units from ethylene and from about 5 to about 30 weight percent of repeat units from one or more other ethylenically unsaturated monomers based upon the weight of said random ethylene copolymer. Thus, the thermoplastic vulcanizate composition comprises between about 12 and about 77 weight percent of polypropylene, based on the total amount of polypropylene, random ethylene copolymer and rubber. The thermoplastic random copolymer of ethylene is prepared by metallocene catalysis. The aim of that disclosure is to provide thermoplastic vulcanizates having increased elongation at break and an increased total toughness. Increasing the softness of the thermoplastic vulcanizate is not addressed. In contrast, the thermoplastic vulcanizates according to the present invention are intended to have improved softness without deterioration of the mechanical properties.

It has been an object of the present invention to provide thermoplastic vulcanizate compositions having superior softness while retaining typical properties known for thermoplastic vulcanizate compositions.

Another object of the invention has been to provide a process for preparing said thermoplastic vulcanizate compositions.

A further object of the invention has been to provide articles comprising said thermoplastic vulcanizate compositions.

SUMMARY OF THE INVENTION

The present invention relates to a thermoplastic vulcanizate (TPV) composition comprising
a) from about 30 to about 95 parts by weight rubber,
b) from about 5 to about 70 parts by weight of a very low density polyethylene copolymer, and
c) optionally up to about 10 parts by weight of polypropylene, wherein said parts by weight are based upon 100 parts by weight of the total amount of said rubber and said very low density polyethylene copolymer, and wherein said rubber in said composition is at least partially vulcanized.

The above amount of polypropylene that may optionally present in the TPV corresponds to up to about 9% by weight, preferably up to about 6.5% by weight, more preferably up to about 4.8% by weight, most preferably up to about 2% by weight, based on the total composition of polypropylene, rubber and very low density polyethylene copolymer.

Furthermore the present invention relates to a process for preparing said TPV composition and an article comprising said TPV composition.

Preferred embodiments will become evident from the detailed description that follows and the appendant claims.

Although the appendant claims in accordance with U.S. patent practice have single dependencies, each of the features in any of the appendant claims can be combined with each of the features of other appendant claims of the independent claim.

DETAILED DESCRIPTION OF THE INVENTION

The term 'thermoplastic vulcanizate' as used herein means a mixture comprising small particles of crosslinked rubber well dispersed in a very low density polyethylene copolymer matrix. Thermoplastic vulcanizates are usually obtained by dynamic vulcanization. The term 'thermoplastic vulcanizate' indicates that the rubber phase is at least partially vulcanized (crosslinked).

The terms 'crosslinked' and 'vulcanized', 'crosslinking' and 'vulcanization' and 'vulcanize' and 'crosslink' are used interchangeably in conjunction with this invention.

Likewise, the term 'thermoplastic vulcanizate composition' is used interchangeably with the term 'thermoplastic vulcanizate'.

The term 'very low density polyethylene copolymer' as used in herein means an ethylene copolymer obtained by copolymerizing ethylene and at least one $\alpha$-olefin different from ethylene in the presence of single site olefin polymerization catalysts (e.g. metallocene catalysts).

The terms 'rubber' and 'elastomer' are used interchangeably in this application and refer to polymers having elastomeric properties and being curable.

The term 'blend' refers to a mixture of the very low density polyethylene copolymer and the non-vulcanized rubber.

The term 'fully vulcanized' in context with the dynamically vulcanized rubber component of this invention denotes that the rubber component has been cured to a state in which the physical properties of the rubber are developed to impart elastomeric properties to the rubber generally associated with the rubber in its conventional vulcanized state. The degree of cure of the vulcanized rubber can be described in terms of gel content or, conversely, extractable components. Alternatively, the degree of cure can be expressed in terms of crosslink density.

In general, the less extractables the cured rubber component contains, the better the properties are. Therefore, it is preferable that the compositions comprise a cured rubber phase from which essentially no rubber can be extracted. The term 'essentially no extractable rubber' means that about 5 wt % or less of the rubber that is capable of being cured can be extracted.

The percent of soluble rubber in the cured composition is determined by refluxing a thin film specimen in boiling xylene for 2 hours or more, weighing the dried residue and making suitable corrections for soluble and insoluble components based upon the knowledge of the composition. Thus, corrected initial and final weights are obtained by subtracting from the initial weight, the weight of soluble components, other than the rubber to be vulcanized, such as extender oils, plasticizers and components of the compositions soluble in organic solvent, as well as that rubber component of the TPV which it is not intended to cure. Any insoluble pigments, fillers, etc., are subtracted from both the initial and final weights.

To employ cross-link density as the measure of the state of cure which characterizes the improved thermoplastic vulcanizate compositions, the blends are vulcanized to the extent which corresponds to vulcanizing the same rubber as in the blend statically cured under pressure in a mold with such amounts of the same curatives as in the blend and under such conditions of time and temperature to give an effective cross-link density greater than about $3 \cdot 10^{-5}$ moles per milliliter of rubber and preferably greater than about $5 \cdot 10^{-5}$ or even more preferably about $1 \cdot 10^{-4}$ moles per milliliter of rubber. The blend is then dynamically vulcanized under similar conditions with the same amount of curative based on the rubber content of the blend as was required for the rubber alone. The cross-link density so determined may be regarded as a measure of the amount of vulcanization which gives the improved thermoplastics.

The cross-link density of the rubber is determined by equilibrium solvent swelling using the Flory-Rehner equation as disclosed in J. Rubber Chem. and Tech. 30, page 929, the disclosure of which is fully incorporated herein. The appropriate Huggins solubility parameters for rubber-solvent pairs used in the calculation were obtained from the review article by Sheehan and Bisio, J. Rubber Chem. & Tech., 39, 149, the disclosure of which is fully incorporated herein. If the extracted gel content of the vulcanized rubber is low, it is necessary to use the correction of Bueche wherein the term 'v' is multiplied by the gel fraction (% gel/100). The cross-link density is half the effective network chain density 'v' determined in the absence of resin. The cross-link density of the vulcanized blends should therefore be understood to refer to the value determined on the same rubber as in the blend in the manner described. Still more preferred compositions meet both of the aforedescribed measures of state of cure, namely, by estimation of cross-link density and percent of rubber extractable.

The terms 'fully vulcanized', 'fully cured' or 'fully crosslinked' as used in the description and claims mean that the rubber component to be vulcanized has been cured or crosslinked to a state in which the elastomeric properties of the crosslinked rubber are similar to those of the rubber in its conventional vulcanized state, apart from the thermoplastic elastomer composition. The rubber component can be described as fully cured when about 5% or less, preferably about 4% or less, more preferably about 3% or less, and most preferably about 2% or less, of the rubber which is capable of being cured is extractable from the thermoplastic elastomer product by refluxing xylene.

The terms 'partially vulcanized', 'partially cured' or 'partially crosslinked' as used in the description and the claims mean that the vulcanizable rubber component has been cured or crosslinked to a state so that more than 5% by weight of the rubber which is capable of being cured is extractable from the thermoplastic elastomer product in boiling xylene, e.g. more than 5% by weight and up to 50% by weight, preferably more than 5% by weight and up to 30% by weight, most preferably more than 5% by weight and up to 15% by weight.

Very Low Density Polyethylene Copolymer

The very low density polyethylene copolymers used in this invention are obtained by single-site catalyzed polymerization of ethylene and one or more comonomers, for instance, such as by metallocene catalysis. In the art, such a very low density polyethylene copolymer is often referred to as a plastomer indicating that it has some properties of both a plastic and an elastomer. Due to the particular catalysts used for their preparation, these copolymers are much more random in terms of the incorporation of comonomer(s) in the copolymer. These thermoplastic random copolymer of ethylene used in this invention can have very narrow molecular weight distributions ($M_w/M_n$; MWD) of from about 1.5 or from about 1.7 to about 3.5, more desirably from about 1.8 to about 3.0 and preferably from about 1.9 to about 2.8. Also, the compositional distribution is exceptionally narrow. The compositional distribution is a measure of variance in comonomer content among the polymer molecules. One measure of the composition distribution is the CDBI, which is a measure of what fraction of the molecule have a comonomer content within 50% (i.e. ±25%) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., J. Poly. Sci., Poly. Phys. Ed., vol. 20, p. 441 (1982) and U.S. Pat. No. 5,008,204, the disclosures of which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature all fractions are assumed to have a Mn≧15,000, where Mn is the number average molecular weight fraction. The low weight fractions (Mn<15,000) generally represent a trivial portion of the polymer of the invention. The remainder of this description and the appended claims maintain this convention of assuming all weight fractions have a Mn≧15,000 in the CDBI measurement. From the weight fraction versus composition distribution curve the CDBI is determined by establishing what weight percent of the sample has a comonomer content within ±25% of the median comonomer content. Further details of determining the CDBI of a copolymer are known to those skilled in the art. As an example it is referred to Published International Patent Application WO 93/03093.

The preferred plastomers for use in the invention have a CDBI which exceeds about 50%, preferably about 60% and more preferably about 70%, in conjunction with which it is referred to U.S. Pat. No. 5,747,592.

The thermoplastic random copolymer of ethylene can have varying amounts of one or more comonomers therein.

Desirably the amount of repeat units of one or more comonomers is from about 5, from about 10, from about 15, from about 20 or from about 25 to about 30, to about 35 or to about 40 weight percent of the very low density polyethylene copolymer. More desirably the amount of repeat units of said one or more comonomers is from about 25 to about 35 weight percent. The amount of ethylene in said thermoplastic random copolymer of ethylene is desirably from about 60, from about 65 or from about 70 to about 75, to about 80, to about 85, to about 90 or to about 95 weight percent, and more desirably from about 65 to about 75 weight percent. The one or more comonomers are selected from ethylenically unsaturated compounds copolymerizable with ethylene using a single-site catalyst. The one or more ethylenically unsaturated monomers desirably have from about 3 or from about 4 to about 12 carbon atoms, more desirably from about 3 or from about 4 to about 8 carbon atoms, and are preferably monoolefins with the specified range of carbon atoms. Examples of such comonomers include monoolefins such as propylene, butene-1, pentene-1, hexene-1, 4-methyl-pentene-1, heptene-1, octene-1, nonene-1, decene-1, undecene-1, dodecene-1, and the like.

The very low density polyethylene copolymer desirably has a density of from about 0.85 or from about 0.86 to about 0.91, to about 0.92 g/cm$^3$, more desirably from about 0.86 or from about 0.87 to about 0.90, to about 0.915 g/cm$^3$. As the polymerization systems, i.e. the metallocene catalysts, readily incorporate comonomers with the ethylene in the thermoplastic random copolymer of ethylene, the comonomers are randomly distributed within the individual polymer chains and the individual polymer chains are rather uniform in comonomer composition. Due to the uniform distribution of repeat units from the comonomers within the polymer chains and the uniformity of comonomer distribution within the polymer, as opposed to prior art polyethylene copolymers, the very low density polyethylene copolymers tend to have rather narrow melting temperature ranges as determined by test methods such as dynamic scanning calorimetry (DSC) as compared to prior art ethylene copolymers that have been obtained, for instance, by Ziegler-Natta catalyzed polymerization or radical polymerization. This is due to the fact that the very low density polyethylene copolymers have a very uniform crystalline structure and thus melt within a narrow temperature range. The random copolymers of ethylene vary from most other ethylene copolymers in that the melting peak in dynamic scanning calorimetry of the random copolymers decreases as the comonomer content increases. The peak represents the largest amount of endothermic crystal melting at a single temperature. Therefore, desirably the random copolymer of ethylene has a peak melting temperature of less than about 120° C., more desirably from about 50 to about 118° C. and preferably from about 55, from about 60, or from about 65 to about 105 or to about 110° C. Prior art polyethylene copolymers obtained by the above conventional methods have a broader melt temperature range because they have a broader range of copolymer compositions.

Generally, it is preferred that the very low density polyethylene copolymers have a hardness of from about 50 Shore A to 50 Shore D (ISO 868-85; after 15 seconds).

Rubber

The rubber may be a polyolefin rubber which, because of the random nature of its repeat structure or side groups, does not tend to crystallize. However, it is prerequisite that the rubber can be vulcanized by the systems set forth herein below. Examples of other rubbers useful here include butyl rubber, halobutyl rubber, halogenated (e.g. brominated) copolymers of p-alkylstyrene and an isoolefin of from 4 to 7 carbon atoms (e.g. isobutylene), natural rubber, homo- and copolymers of at least one diene monomer, or combinations thereof.

Desirably, the rubber is an olefin rubber such as EPDM-type rubber. EPDM-type rubbers are generally terpolymers derived from the polymerization of at least two different monoolefin monomers having from about 2 to about 10 carbon atoms, preferably about 2 to about 4 carbon atoms, with at least one poly-unsaturated olefin having from about 5 to about 20 carbon atoms. Said monoolefins can desirably be represented by the formula $CH_2$=CH—R wherein R is H or an alkyl group having from about 1 to about 12 carbon atoms. Preferable monoolefins are exemplified by ethylene and propylene. Desirably, the repeat units from at least two monoolefins (and preferably from ethylene and propylene) are present in the polymer in weight ratios of about 25:75 to about 75:25 (ethylene:propylene) and constitute from about 90 to about 99.6 weight percent of the polymer. The polyunsaturated olefin can be selected from straight chained, branched, cyclic, bridged ring bicyclic compounds, fused ring bicyclic compounds, and the like. A preferred polyunsaturated olefin is represented by a nonconjugated diene. Typical examples are selected from 5-ethylidene-2-norbornene, 5-vinyl-2-norbornene, 1,4-hexadiene, 1,6-octadiene, 5-methyl-1,4-hexadiene, 3,7-dimethyl-1,6-octadiene, and the like. Desirably, the amount of repeat units derived from the non-conjugated polyunsaturated olefin is from about 0.4 to about 10 weight percent of the rubber, based on the amount of the rubber.

Blend

The TPV of the present invention preferably comprises about 50 to about 95 parts by weight, more preferably about 70 to 90 parts by weight of the rubber component and preferably about 5 to about 50 parts by weight, more preferably about 10 to about 30 parts by weight of very low density polyethylene copolymers used in the invention, based on 100 parts by weight of the total amount of rubber and very low density polyethylene copolymer. With increasing preference in the order given, the TPV of the present invention comprises 0 to about 7 parts by weight, up to about 5 parts by weight, up to about 2 parts by weight of polypropylene, based on 100 parts by weight of said rubber and very low density polyethylene copolymer. In one alternative embodiment the TPV of the present invention does not contain any polypropylene.

Additives

Depending on the desired end-use, the thermoplastic vulcanizate can include a variety of conventional additives in an amount sufficient to bring about the desired effect. The additives include particulate fillers such as carbon black, silica, titanium dioxide, colored pigments, clay, zinc oxide, stearic acid, stabilizers, antidegradants, UV-stabilizers, flame retardants, processing aids, adhesives, tackifiers, plasticizers, waxes, discontinuous fibers (such as wood cellulose fibers) and extender oils. When extender oil is used it can be present in amounts from about 5 to about 300 parts by weight per 100 parts by weight of the blend of very low density polyethylene copolymer and rubber. The amount of extender oil (e.g., hydrocarbon oils and ester plasticizers) is preferably in the range from about 30 to about 250 parts, and more desirably from about 70 to about 200 parts by weight per 100 parts by weight of said blend of very low density polyethylene copolymer and rubber. When non-black fillers are used, it is desirable to include a coupling agent to compatibilize the interface between the non-black fillers and polymers. Desirable amounts of carbon black, when present, are from about 5 to about 250 parts by weight per 100 parts by weight of said blend of very low density polyethylene copolymer and rubber.

Vulcanizing Agents

Agents suitable for vulcanizing the composition are generally referred to as curatives. They may be formulated and used together with curing accelerators or retardants. These formulations are usually referred to as vulcanizing systems or cure systems. It is common knowledge of the skilled person which retardants or accelerators to use in order to accomplish a desired activity and effect of the curative.

In the composition of the invention, only the rubber component of the TPV should be vulcanized, or crosslinked. Those ordinarily skilled in the art will appreciate the appropriate quantities, types of cure systems and vulcanization conditions required to carry out the vulcanization of the rubber. The rubber can be vulcanized using varying amounts of curative, varying temperatures and varying time of cure in order to obtain the desired degree of vulcanization, preferably full vulcanization. Known curatives systems can be used, as long as they are suitable under the vulcanization conditions for the rubbers being used and are compatible with the very low density polyethylene copolymer component. It is not desirable to use a curative that crosslinks the very low density polyethylene copolymer. Therefore, the peroxide-based systems that are known to cause crosslinking of polyolefins are not suitable for use in this invention. Suitable cure systems include metal oxides, resin systems, maleimides, and the like, both with and without accelerators and coagents.

Suitable curative systems include zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet® (2,4,6-trimercapto-5-triazine), ZDEDC (zinc diethyl dithiocarbamate) and other dithiocarbamates, Tetrone® A (dipenta-methylene thiuram hexasulfide), Vultac-5® (alkylated phenol disulfide), SP1045 (phenol formaldehyde resin), SP1056 (brominated alkylphenol formaldehyde resin), DPPD (diphenyl phenylene diamine), salicylic acid (o-hydroxy benzoic acid), wood rosin (abietic acid), and TMTDS (tetramethyl thiuram disulfide) in combination with sulfur.

Another curing system that can be used is the hydrosilylation system which consists of a silicon hydride curative catalyzed with a transition metal derivative. Such systems are disclosed in, for instance, published European patent application EP 0776937, the disclosure of which is fully incorporated herein by reference. According to this method a silicon hydride having at least two SiH groups in the molecule is reacted with the carbon-carbon multiple bonds of the unsaturated (i.e. containing at least one carbon-carbon double bond) rubber component of the thermoplastic rubber, in the presence of the thermoplastic resin and a hydrosilylation catalyst. Examples of silicon hydride compounds include methylhydrogen polysiloxanes, methylhydrogen dimethylsiloxane copolymers, alkyl methyl polysiloxanes, bis(dimethylsilyl)alkanes and bis(dimethylsilyl)-benzene.

Particularly preferred polyorganosiloxanes are those in which the silicon atom of the silicon hydride functionality is bound by heteroatoms/atoms having lone pairs of electrons. The preferred polyorganosiloxanes may also be substituted with appropriate functionality permitting solubility in the reaction media. A type of this functionalization is described in U.S. Pat. No. 4,046,930 which teaches alkylation of polyorganosiloxanes, the disclosure of which is fully incorporated herein by reference. Weight percent of alkylation should not exceed a level that does not permit adequate reaction rates due to steric constraints.

The amount of silicon hydride compound useful in the process of the present invention can range from about 0.1 to about 10.0 mole equivalents of SiH per carbon-carbon double bond in the rubber, and preferably is in the range of about 0.5 to about 5.0 mole equivalents of SiH per carbon-carbon double bond in the rubber component of the thermoplastic rubber.

It is understood by the skilled person that any catalyst, or catalyst precursor capable of generating a catalyst in situ, which will catalyze the hydrosilylation reaction with the carbon-carbon bonds of the rubber can be used. Such catalysts include transition metals of Group VIII such as palladium, rhodium, platinum and the like, including complexes of these metals. Chloroplatinic acid has been disclosed as a useful catalyst in U.S. Pat. No. 4,803,244 and published European patent application EP 0651009, which further disclose that the catalyst may be used at concentrations of about 5 to about 10,000 parts per million by weight and about 100 to about 200,000 parts per million by weight based on the weight of rubber, respectively. The disclosure of both of these is fully incorporated herein by reference. It has been disclosed in published European patent application EP 0776937, the disclosure of which is fully incorporated herein by reference, that significantly lower concentrations of platinum-containing catalyst can be used, while obtaining improvement in both the speed of the reaction and the efficiency of the crosslinking. Concentrations of catalyst in the range of about 0.01 to about 20 parts per million by weight, expressed as platinum metal, are effective in rapidly and completely curing the rubber in the process of dynamically vulcanizing blends of thermoplastic resin and rubber. Catalyst concentrations of about 0.1 to about 4 parts per million by weight based on the weight of rubber, expressed as platinum metal, are particularly preferred.

Platinum-containing catalysts that are useful in the process of the invention are described, for example, in U.S. Pat. No. 4,578,497, U.S. Pat. No. 3,220,972, and U.S. Pat. No. 2,823,218, all of which are fully incorporated herein by reference. These catalysts include chloroplatinic acid, chloroplatinic acid hexahydrate, complexes of chloroplatinic acid with sym-divinyl tetramethyldisiloxane, dichloro-bis(triphenylphosphine) platinum (II), cis-dichloro-bis(acetonitrile) platinum (II), dicarbonyldichloroplatinum (II), platinum chloride and platinum oxide. Zero valent platinum metal complexes such as Karstedt's catalyst are particularly preferred, as described in U.S. Pat. No. 3,775,452, U.S. Pat. No. 3,814,730, and U.S. Pat. No. 4,288,345, all of which are fully incorporated herein by reference.

Phenolic resin curatives are preferred for the preparation of the TPV composition of the invention, and such cure systems are well known in the art and literature of vulcanization of rubbers. Their use in TPV compositions is more fully described in U.S. Pat. No. 4,311,628, the disclosure of which is fully incorporated herein by reference.

A basic ingredient of such a system is a phenolic curing resin made by condensation of halogen substituted phenol, $C_1$-$C_{10}$ alkyl substituted phenol or unsubstituted phenol with an aldehyde, preferably formaldehyde, in an alkaline medium or by condensation of bifunctional phenoldialcohols. Dimethylol phenols substituted in the para-position with $C_5$-$C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in U.S. Pat. No. 3,287,440 and U.S. Pat. No. 3,709,840, the disclosures of which are fully incorporated herein by reference. Non-halogenated phenol curing resins are used in conjunction with halogen donors, preferably, along with a hydrogen halide scavenger. Ordinarily, halogenated, preferably brominated, phenolic resins containing about 2 to about 10 weight percent bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the cross-linking function of the phenolic resin, however, with rubbers which do not readily cure with phenolic resins, the conjoint use of a halogen donor and zinc oxide is recommended. The preparation of halogenated phenol resins and their use in a curative system with zinc oxide are described in U.S. Pat. No. 2,972,600 and U.S. Pat. No. 3,093,613, the disclosures of which are fully incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term 'activator' as used herein means any material which materially increases the cross-linking efficiency of the phenolic curing resin and includes metal oxides and halogen donors either used alone or conjointly. For further details of phenolic curative systems see 'Vulcanization and Vulcanizing Agents,' W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. In general, a vulcanizing amount of phenolic curative comprises from about 1 to about 20 parts by weight, more preferably from about 3 to about 16 parts by weight, and even more preferably from about 4 to about 12 parts by weight, phenolic resin per hundred parts by weight rubber (phr).

Process for Preparing the Thermoplastic Vulcanizates

The thermoplastic vulcanizates of this invention are prepared by using dynamic vulcanization techniques. Dynamic vulcanization is a process whereby at least one rubber is crosslinked within a blend that includes the rubber and at least one non-vulcanizing polymer, i.e., thermoplastic polymer, while both polymers are undergoing mixing or masticating at some elevated temperature; the mixing or masticating is continued until a desired vulcanization is achieved.

More specifically, the very low density polyethylene copolymer, the uncured rubber, and, optionally, additives are melt-mixed in a mixer heated to above the melting temperature of the very low density polyethylene copolymer. The optional additives as well as part of the polymeric components can be added at this stage or later (e.g. by means of a side feeder if an extruder is used). After sufficient molten-state mixing to form a well mixed blend, an efficient amount of a vulcanizing system is generally added. In some embodiments it is preferred to add the vulcanizing system in solution with a liquid, for example a rubber processing oil, or in a masterbatch which is compatible with the other components.

It is convenient to follow the progress of vulcanization by monitoring mixing torque or mixing energy requirements during mixing. The mixing torque or mixing energy curve generally goes through a maximum after which mixing can be continued somewhat longer to improve the fabricability of the blend. If desired, one can add some of the ingredients after the dynamic vulcanization is complete.

If fillers are added it is usually desirable to allow the fillers and a portion of any plasticizer to distribute themselves in the rubber or very low density polyethylene copolymer phase before the rubber phase is vulcanized. Vulcanizing of the rubber can occur in a few minutes or less depending on the mix temperature, shear rate, and activators present for the curative. Suitable curing temperatures include from about 140° C. or from about 150° C. to about 240° C., more preferred temperatures are from about 150° C. or from about 170° C. to about 225° C. or to about 240° C. The mixing equipment can include Banbury™ mixers, Brabender™ mixers, and certain mixing extruders such as co-rotating, counter-rotating, and twin-screw extruders, as well as co-kneaders, such as Buss® kneaders.

After discharging from the mixer the blend containing the vulcanized rubber and the thermoplastic can be milled, chopped, extruded, palletized, injection-molded, or processed by any other desirable technique.

Thermoplastic Vulcanizate

The thermoplastic vulcanizates according to the present invention generally have a hardness of from about 10 Shore A to about 90 Shore A, preferably about 35 Shore A or less, more preferably of from about 20 to about 30 Shore A. The Shore A hardness is measured according to ISO 868-85, after 15 seconds.

The elongation at break typically is higher than about 500%, preferably higher than about 550%, more preferably higher than about 600%.

The ultimate tear strength generally is higher than about 2.5 MPa, preferably higher than about 2.7 MPa, more preferably higher or equal to about 2.8 MPa.

The tear is in the range of from about 10 to about 15 kN/m, preferably about 12 to about 15 kN/m.

Due to the specific nature of the very low density polyethylene copolymers and in view of their known properties other advantages may be further expected, such as improved gloss and improved UV weathering resistance.

The thermoplastic vulcanizate compositions of the invention have a softness which has not been obtained with polypropylene based thermoplastic vulcanizate compositions while showing essentially equivalent mechanical properties.

The thermoplastic vulcanizate compositions of the present invention are useful for for making a variety of articles such as tires, hoses, belts, gaskets, moldings and molded parts. They are particularly useful for making articles by extrusion injection molding blow molding, and compression molding techniques. They are also useful for modifying thermoplastic resins and in particular polyolefin resins. The compositions can be blended with thermoplastic resins using conventional mixing equipment making a rubber modified thermoplastic resin. These compositions will be particularly useful in consumer goods where a "soft feel" is desirable, such as touch pads, handle inserts, overcasings or overmoldings (e.g. used for shaving razors) and the like.

While the present invention has been described and illustrated by reference to particular embodiments, those of ordinary skill in the art will appreciate that the invention lends itself to many different variations not illustrated herein. For these reasons, then, reference should be made solely to the appended claims for purpose of determining the true scope of the present invention.

EXAMPLES

Methods for determining of the data disclosed in the Examples:

All evaluations are performed at room temperature (unless indicated differently) on 2 mm thick injection molded plaques or specimens (as indicated, such as dumbbells, buttons) cut out off these plaques.

Tensile properties (Ultimate tensile strength, Elongation at break, Modulus (at 10%, 20%, 50%, 100%, 300%)): ISO 37 (dumbbell type 2—speed 500 mm/min)

Hardness: ISO 868-85 (after 15 seconds) on a piled up series of 3 test pieces of 2 mm thickness Tear (unnicked): ISO 34/1 (Method B, a—speed 500 mm/min)

Compression set: ISO 815B, Method B, by compressing the sample (piled up series of 3 test pieces of 2 mm thickness) for 22 hours at the indicated temperature Oil weeping: visual observation made on 2 mm plaques after 3 weeks at room temperature Oil extraction on paper: a 2 mm plaque is kept between 2 paper sheets for 3 weeks. After this period, a visual observation for possible oil marks on the 2 sheets is made

TABLE 1

Starting Materials and Relevant Properties

| | Hardness Shore A/Shore D | Density [g/cm$^3$] | Melting peak temperature [° C.] | Comonomer content/type |
|---|---|---|---|---|
| Exact 4033 | 85/30 | 0.880 | 60 | 33%/butene |
| Exact 8201 | 85/29 | 0.882 | 70 | 30%/octene |
| Engage 8003 | 86/n.a. | 0.885 | n.a. | 30%/octene |
| SEBS Kraton G1651 | 76/n.a. | 0.91 | n.a. | — |
| HA507MO[#] | n.a. | 0.908 | n.a. | — |
| HF136MO[#] | n.a. | 0.908 | n.a. | — |
| Vistalon 3666N ®[§] | n.a. | n.a. | n.a. | 64%/ethene 4.5%/ENB[*] | n.a.: not available
[#]Polypropylene homopolymer, commercially available from Borealis A/S
[§]EPDM copolymer, commercially available from ExxonMobil Chemical
[*]ENB = 5-ethylidene-2-norbornene

TABLE 2

Composition of Tested Formulations

| | Comparative | | | | | | According to the Invention | | |
|---|---|---|---|---|---|---|---|---|---|
| | 1 | 2 | 3 | 4 | 5 | 6 | 1 | 2 | 3 |
| Vistalon 3666 N | 51.84 | 51.84 | 51.84 | 51.84 | 51.84 | 51.84 | 51.84 | 51.84 | 51.84 |
| PP HF 136MO | 3.55 | 3.55 | 2.66 | 1.78 | 0.89 | 0.00 | 0.00 | 0.00 | 0.00 |
| PP HA 507MO | 4.44 | 4.44 | 3.33 | 2.22 | 1.11 | 0.00 | 0.00 | 0.00 | 0.00 |
| SEBS Kraton G 1651 | 0.00 | 0.00 | 2.00 | 4.00 | 5.99 | 7.99 | 0.00 | 0.00 | 0.00 |
| Exact 4033 | 0.00 | 0.00 | 0.00 | 0.00 | 0.00 | 0.00 | 7.99 | 0.00 | 0.00 |
| Exact 8201 | 0.00 | 0.00 | 0.00 | 0.00 | 0.00 | 0.00 | 0.00 | 7.99 | 0.00 |
| Engage 8003 | 0.00 | 0.00 | 0.00 | 0.00 | 0.00 | 0.00 | 0.00 | 0.00 | 7.99 |
| CaCO$_3$ Polestar 200P | 12.44 | 12.44 | 12.44 | 12.44 | 12.44 | 12.44 | 12.44 | 12.44 | 12.44 |
| Oil Sunpar 150 | 23.87 | 23.87 | 23.87 | 23.87 | 23.87 | 23.87 | 23.87 | 23.87 | 23.87 |
| ZnO | 0.59 | 0.59 | 0.59 | 0.59 | 0.59 | 0.59 | 0.59 | 0.59 | 0.59 |

TABLE 2-continued

Composition of Tested Formulations

|  | Comparative | | | | | | According to the Invention | | |
| --- | --- | --- | --- | --- | --- | --- | --- | --- | --- |
|  | 1 | 2 | 3 | 4 | 5 | 6 | 1 | 2 | 3 |
| SnCl₂ anhydrous | 0.37 | 0.37 | 0.37 | 0.37 | 0.37 | 0.37 | 0.37 | 0.37 | 0.37 |
| Wax Okerin 2709H | 1.03 | 1.03 | 1.03 | 1.03 | 1.03 | 1.03 | 1.03 | 1.03 | 1.03 |
| Resin in oil SMD 31214 | 1.87 | 1.87 | 1.87 | 1.87 | 1.87 | 1.87 | 1.87 | 1.87 | 1.87 |
| Total | 100 | 100 | 100 | 100 | 100 | 100 | 100 | 100 | 100 |

TABLE 3

Properties of Tested Formulations

|  | Comparative | | | | | | According to the Invention | | |
| --- | --- | --- | --- | --- | --- | --- | --- | --- | --- |
|  | 1 | 2 | 3 | 4 | 5 | 6 | 1 | 2 | 3 |
| Hardness [Shore A] | 46 | 47 | 39 | 32 | 26 | 24 | 26 | 28 | 30 |
| UTS [MPa] | 3.1 | 2.7 | 2.5 | 2.2 | 1.8 | 1.5 | 2.9 | 2.5 | 3.0 |
| Elongation [%] | 342 | 320 | 344 | 356 | 348 | 333 | 559 | 568 | 576 |
| M10 [MPa] | 0.347 | 0.352 | 0.269 | 0.207 | 0.162 | 0.150 | 0.163 | 0.163 | 0.178 |
| M20 [MPa] | 0.505 | 0.516 | 0.398 | 0.310 | 0.244 | 0.227 | 0.241 | 0.254 | 0.280 |
| M50 [MPa] | 0.799 | 0.813 | 0.625 | 0.487 | 0.395 | 0.369 | 0.397 | 0.409 | 0.446 |
| M100 [MPa] | 1.179 | 1.187 | 0.924 | 0.714 | 0.582 | 0.551 | 0.572 | 0.561 | 0.622 |
| M300 [MPa] | 2.854 | 2.669 | 2.357 | 2.010 | 1.679 | 1.413 | 1.362 | 1.260 | 1.332 |
| Tear (unnicked) [kN/m] | 14 | 14 | 12 | 10 | 8 | 8 | 12 | 12 | 13 |
| Compression Set @ RT [%] | 14 | 17 | 16 | 19 | 17 | 16 | 20 | 16 | 17 |
| Compression Set @ 70° C. [%] | 34 | 32 | 36 | 38 | 37 | 49 | 67 | 65 | 61 |
| LCR viscosity [Pa · s] (204° C., 1200 s⁻¹) | 80 | 75 | 89 | 118 | 141 | 158 | 165 | 163 | 161 |
| Oil weeping | no | no | no | no | no | no | no | no | no |
| Oil extraction on paper | no | no | no | no | no | no | no | no | no |
| Stickiness | no | no | no | no | no | no | no | ± | ± |
| Rebound test [%] | 58 | 57 | 62 | 70 | 70 | 71 | 71 | 68 | 66 |

What is claimed is:

1. A thermoplastic vulcanizate composition consisting essentially of:
   a) from about 30 to about 95 parts by weight of a rubber selected from the group consisting of polyolefin copolymer rubbers, butyl rubber, halobutyl rubber, natural rubber, homo- and copolymers of at least one diene monomer, and combinations thereof
   b) from about 10 to about 70 parts by weight of a very low density polyethylene copolymer;
   c) optionally up to 5 parts by weight of polypropylene;
   d) a curative; and
   e) one or more additives;
   wherein said parts by weight are based upon 100 parts by weight of the total amount of said rubber and said very low density polyethylene copolymer, wherein said rubber in said composition is at least partially vulcanized, and where said very low density polyethylene copolymer has a density of from about 0.85 to about 0.91 g/cm³, and said very low density polyethylene copolymer is characterized by a CDBI that exceeds about 50%; and wherein the composition has a Shore A hardness (ISO 868-85) of about 35 or less.

2. The composition according to claim 1, wherein said polyolefin copolymer rubber is ethylene/propylene/non-conjugated diene copolymer rubber (EPDM).

3. The composition according to claim 1, wherein said very low density polyethylene copolymer is a copolymer of ethylene and an α-olefin containing from about 4 to about 12 carbon atoms.

4. The composition according to claim 3, wherein said α-olefin contains from about 4 to about 8 carbon atoms.

5. The composition according to claim 4, wherein said α-olefin is selected from the group consisting of butene, hexene and octene.

6. The composition according to claim 1, wherein the comonomer content in said very low density polyethylene copolymer is from about 10 to about 50% by weight, based on said very low density polyethylene copolymer.

7. The composition according to claim 6, wherein the comonomer content is from about 25 to about 35% by weight.

8. The composition according to claim 1 having a Shore A hardness (ISO 868-85) of about 25 or less.

9. The composition according to claim 1 having an ultimate tensile strength (ISO 37) of at least about 2.5 MPa.

10. The composition according to claim 1 having an elongation at break (ISO 37) of at least about 500%.

11. The composition according to claim 1, wherein the composition is fully vulcanized.

12. A process for making the thermoplastic vulcanizate composition according to claim 1 comprising
   (i) blending
      a) from about 30 to about 95 parts by weight of a rubber selected from the group consisting of polyolefin copolymer rubbers, butyl rubber, halobutyl rubber, natural rubber, homo- and copolymers of at least one diene monomer, and combinations thereof,
      b) from about 10 to about 70 parts by weight of very low density polyethylene copolymer,
      c) up to about 5 parts by weight of polypropylene, and d) an effective amount of a curative to at least partially vulcanize the rubber, wherein said parts by weight are based upon 100 parts by weight of the total amount of said rubber, said very low density polyethylene copolymer and optionally polypropylene, and where said very low density polyethylene copolymer has a density of from about 0.85 to about 0.91 g/cm$^3$, and said very low density polyethylene copolymer is characterized by a CDBI that exceeds about 50%, and e) one or more additives; and (ii) exposing the blend to conditions of dynamic vulcanization to at least partially vulcanize said rubber.

13. The process according to claim 12, wherein the curative is selected from a phenolic resin curative or a curative effective by means of a hydrosilylation reaction.

14. An article comprising the thermoplastic vulcanizate composition according to claim 1.

15. The article according to claim 14, wherein the article is formed by extrusion, injection molding, blow molding, or compression molding.

16. The composition according to claim 1, where the composition optionally comprises up to about 2 parts by weight polypropylene.

17. The composition according to claim 1, where the composition is devoid of polypropylene.

18. The composition according to claim 1, where the very low density polyethylene copolymer is characterized by a CDBI that exceeds about 60%.

19. The composition according to claim 1, where the very low density polyethylene copolymer is characterized by a CDBI that exceeds about 70%.

20. The composition according to claim 1, where the very low density polyethylene copolymer is characterized by a density of less than about 0.90 g/cm$^3$.

* * * * *